US012802435B2

(12) United States Patent
Baek et al.

(10) Patent No.: US 12,802,435 B2
(45) Date of Patent: Nov. 17, 2026

(54) APPARATUS AND METHOD FOR NEURAL NETWORK TRAINING OF DENTAL IMAGES THROUGH PATIENT- SPECIFIC DATA AUGMENTATION

(71) Applicant: UIF (UNIVERSITY INDUSTRY FOUNDATION), YONSEI UNIVERSITY, Seoul (KR)

(72) Inventors: Jongduk Baek, Incheon (KR); Junhyun Ahn, Incheon (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 265 days.

(21) Appl. No.: 18/934,180

(22) Filed: Oct. 31, 2024

(65) Prior Publication Data

US 2026/0120448 A1 Apr. 30, 2026

(30) Foreign Application Priority Data

Oct. 29, 2024 (KR) ........................ 10-2024-0150150

(51) Int. Cl.
*G06K 9/00* (2022.01)
*G06T 7/11* (2017.01)
(Continued)

(52) U.S. Cl.
CPC ................ *G06V 10/82* (2022.01); *G06T 7/11* (2017.01); *G06T 7/136* (2017.01); *G06T 7/155* (2017.01);
(Continued)

(58) Field of Classification Search
CPC . G06T 2207/10072; G06T 2207/10081; G06T 2207/20081; G06T 2207/20084;
(Continued)

(56) References Cited

U.S. PATENT DOCUMENTS 11,367,188 B2 * 6/2022 Kearney .............. A61B 5/0088
2008/0205717 A1 * 8/2008 Reeves ................... G06T 12/30
382/128

(Continued)

FOREIGN PATENT DOCUMENTS

KR 10-2022-0022328 A 2/2022

OTHER PUBLICATIONS

Van Gompel, Gert, et al. "Iterative correction of beam hardening artifacts in CT." Medical physics 38.S1 (2011): S36-S49. (Year: 2011).*

(Continued)

*Primary Examiner* — Hadi Akhavannik
(74) *Attorney, Agent, or Firm* — Studebaker Brackett PLLC

(57) ABSTRACT

A neural network training apparatus for dental images through patient-specific data augmentation of the present disclosure includes a bone segmentation unit configured to segment a bone in a dental image to generate a bone mask, a tooth labeling unit configured to label a tooth into which a metal will be inserted in the bone mask to generate a labeled dental image, a metal mask generation unit configured to generate a metal mask in the labeled dental image and perform data augmentation with the metal mask to generate a plurality of augmented metal masks, and a metal-affected image processing unit configured to simulate polychromatic spectrum-based metal artifacts in the plurality of augmented metal masks and calculate a metal attenuation coefficient to generate a metal-affected dental image.

11 Claims, 9 Drawing Sheets

(51) Int. Cl.

| | |
|---|---|
| ***G06T 7/136*** | (2017.01) |
| ***G06T 7/155*** | (2017.01) |
| ***G06V 10/82*** | (2022.01) |
| ***G06V 10/88*** | (2022.01) |
| ***G06V 20/70*** | (2022.01) |

(52) U.S. Cl.
CPC .............. *G06V 10/88* (2022.01); *G06V 20/70* (2022.01); *G06T 2207/10072* (2013.01); *G06T 2207/30036* (2013.01)

(58) Field of Classification Search
CPC . G06T 2207/30008; G06T 2207/30036; G06T 5/60; G06T 7/11; G06T 7/136; G06T 7/155; G06V 10/82; G06V 10/88; G06V 20/70
See application file for complete search history.

(56) References Cited

U.S. PATENT DOCUMENTS

| | | | | |
|---|---|---|---|---|
| 2013/0230818 | A1* | 9/2013 | Matov | A61B 6/032 433/3 |
| 2013/0282351 | A1* | 10/2013 | Tank | A61C 13/0004 703/11 |
| 2021/0056688 | A1* | 2/2021 | Xu | G06T 12/30 |
| 2021/0343400 | A1* | 11/2021 | Inam | G06T 7/0012 |

OTHER PUBLICATIONS

Tuncer, Özgür. Segmentation registration and visualization of medical images for treatment planning. MS thesis. Middle East Technical University, 2003. (Year: 2003).*

Park et al.; "A fidelity-embedded learning for metal artifact reduction in dental CBCT"; Medical Physics; May 18, 2022; pp. 5195-5205; vol. 49, No. 8; American Association of Physicists in Medicine; URL: https://aapm.onlinelibrary.wiley.com/doi/10.1002/mp.15720.

Jang et al.; "A Fully Automated Method for 3D Individual Tooth Identification and Segmentation in Dental CBCT"; IEEE Transactions on Pattern Analysis and Machine Intelligence; Jun. 2, 2021; pp. 6562-6568; vol. 44, No. 10; IEEE; URL: https://ieeexplore.ieee.org/document/9445658.

Park et al.; "Metal Artifact Reduction for Polychromatic X-ray CT Based on a Beam-Hardening Corrector"; IEEE Transactions on Medical Imaging; Sep. 15, 2015; pp. 480-487; vol. 35, No. 2; IEEE; Url: https://ieeexplore.ieee.org/document/7268881.

Park et al.; "Computed tomographic beam-hardening artefacts: mathematical characterization and analysis"; Philosophical Transactions a Math Phys Eng Sci; Jun. 13, 2015; pp. 1-11; vol. 373, No. 2043; The Author(s) Published by the Royal Society; URL: https://royalsocietypublishing.org/rsta/article-abstract/373/2043/20140388/114867/Computed-tomographic-beam-hardening-artefacts?redirectedFrom=fulltext.

Office Action issued in KR 10-2024-0150150; mailed by the Korean Ministry of Intellectual Property on Apr. 28, 2026.

* cited by examiner

APPARATUS AND METHOD FOR NEURAL NETWORK TRAINING OF DENTAL IMAGES THROUGH PATIENT- SPECIFIC DATA AUGMENTATION

CROSS-REFERENCE TO RELATED APPLICATION

This application claims under 35 U.S.C. § 119(a) the benefit of Korean Patent Application No. 10-2024-0150150 filed on Oct. 29, 2024, the entire contents of which is incorporated herein by reference.

TECHNICAL FIELD

The present disclosure relates to a neural network training of dental images, and more specifically, to a neural network training apparatus and method for dental images through patient-specific data augmentation, which labels a metal insertion location in dental images and generates augmented data reflecting the influence of metal, thereby reducing image distortion caused by metal artifacts and improving diagnostic accuracy.

BACKGROUND

Computed tomography (CT) technology is an essential tool in various medical diagnoses, and is used to establish diagnosis and treatment plans by providing detailed images of the inside of the human body. However, if there is a metal implant in the patient's body, a localized stripe-shaped distortion, i.e., metal artifacts, may occur around the metal object in a CT image due to the high attenuation coefficient of the metal. Such metal artifacts are problematic because they lower the resolution of the image, interfere with accurate diagnosis, and distort important information. Therefore, various technologies have been developed to reduce metal artifacts.

Conventional metal artifact reduction (MAR) methods include techniques such as LMAR (Linearly Interpolated MAR) and NMAR (Normalized MAR), which work by interpolating an area with metal traces in sinogram data to restore the information of the area. However, these techniques have limitations in completely removing complex patterns of metal artifacts, which may limit their use in clinical settings.

Recently, with the advancement of deep learning technology, various deep learning-based MAR methods have been proposed in image areas, sinogram areas, and hybrid areas that combine the same. Deep learning-based approaches have shown superior metal artifact reduction performance than traditional methods by utilizing simulation data, contributing to improved image quality. However, most deep learning-based MAR methods require supervised learning, which requires data pairs in which images containing anatomically identical metals and images without metals correspond one-to-one. Collecting such data pairs is realistically difficult and requires a lot of time and money, which limits their use.

Korean Patent Publication No. 10-2022-0022328 (2022.02.25) provides a method and device for correcting artifacts in CT images, including the steps of reconstructing a first backprojected image and a second backprojected image of first projection data and second projection data, and generating an image with attenuated artifacts in the reconstructed CT image, and aims to reduce the amount of computation by avoiding an inefficient iterative reconstruction structure.

A method of correcting metal artifacts in a CT image includes the steps of reconstructing a CT image including artifacts by a processor, segmenting a metal region in the reconstructed CT image, calculating a light penetration length along the metal region to generate first projection data according to the metal region, generating second projection data related to artifacts around the metal region using the light penetration length, reconstructing a first backprojected image and a second backprojected images of the first projection data and the second projection data, and generating an image in which artifacts included in the reconstructed CT image have been attenuated using the first backprojected image and the second backprojected image.

PATENT LITERATURE

Korean Patent Publication No. 10-2022-0022328 (2022.02.25)

DESCRIPTION

Problem to be Solved

One embodiment of the present disclosure provides a neural network training apparatus and method for dental images through patient-specific data augmentation, which labels a metal insertion location in a dental image and generates augmented data reflecting the influence of the metal, thereby reducing image distortion caused by metal artifacts and improving diagnostic accuracy.

One embodiment of the present disclosure provides a neural network training apparatus and method for dental images through patient-specific data augmentation, which calculates the mean and variance of tissue by applying a Gaussian mixture model (GMM) to a dental image, and generates an adaptive bone threshold value based on the calculated mean and variance to generate a bone mask.

One embodiment of the present disclosure provides a neural network training apparatus and method for dental images through patient-specific data augmentation, which performs connected component labeling (CCL) in an initial labeling process when labeling a metal insertion location in a dental image, and then applies morphological erosion to perform clear separation between teeth.

Solution

In an embodiment, a neural network training apparatus for dental images through patient-specific data augmentation includes a bone segmentation unit configured to segment a bone in a dental image to generate a bone mask, a tooth labeling unit configured to label a tooth into which a metal will be inserted in the bone mask to generate a labeled dental image, a metal mask generation unit configured to generate a metal mask in the labeled dental image and perform data augmentation with the metal mask to generate a plurality of augmented metal masks, and a metal-affected image processing unit configured to simulate polychromatic spectrum-based metal artifacts in the plurality of augmented metal masks and calculate a metal attenuation coefficient to generate a metal-affected dental image.

The bone segmentation unit may calculate a mean and a variance of tissue by applying a Gaussian mixture model (GMM) to the dental image and calculate an adaptive bone threshold value through the mean and variance. The bone segmentation unit may generate the bone mask such that the bone is segmented from the tissue by considering an attenuation coefficient difference between the tissue and the bone through the mean and variance.

The tooth labeling unit may perform initial labeling through connected component labeling (CCL) on the bone mask, separate the tooth through morphological erosion, and then complete the labeling. The tooth labeling unit may perform real tooth labeling by applying threshold filtering to the initial label obtained through the connected component labeling (CCL) to remove noise below a certain threshold value. The tooth labeling unit may perform clear tooth labeling by applying morphological erosion to the real tooth labeling to disconnect adjacent teeth and clearly distinguish between the adjacent teeth. The tooth labeling unit may apply shrunk region labeling to the clear tooth labeling to supplement a tooth region that has disappeared due to the morphological erosion and generate the labeled dental image through tooth selection.

The metal mask generation unit may determine the number, shape, and size of a metal to be inserted into the metal mask through data augmentation to generate the plurality of augmented metal masks.

The metal-affected image processing unit may perform polychromatic sinogram simulation on the plurality of augmented metal masks, generate a metal insertion image, and apply beam hardening correction and filtered back projection to the metal insertion image to generate the metal-affected dental image. The metal-affected image processing unit may adjust the intensity of the metal artifacts by adjusting the metal attenuation coefficient during the polychromatic sinogram simulation process.

In an embodiment, a neural network training method for dental images through patient-specific data augmentation, performed in a neural network training apparatus for dental images through patient-specific data augmentation, includes a bone segmentation step of segmenting a bone in a dental image to generate a bone mask, a tooth labeling step of labeling a tooth into which a metal will be inserted in the bone mask to generate a labeled dental image, a metal mask generation step of generating a metal mask in the labeled dental image and performing data augmentation with the metal mask to generate a plurality of augmented metal masks, and a metal-affected image processing step of simulating polychromatic spectrum-based metal artifacts in the plurality of augmented metal masks and calculating a metal attenuation coefficient to generate a metal-affected dental image.

Advantageous Effects

The disclosed technology has the following effects. However, it should be understood that the scope of the disclosed technology is not limited thereby since it does not mean that a specific embodiment must include all or only the following effects.

The neural network training apparatus and method for dental images through patient-specific data augmentation according to one embodiment of the present disclosure can reduce image distortion caused by metal artifacts and improve diagnostic accuracy by labeling a metal insertion location in a dental image and generating augmented data reflecting the influence of the metal.

The neural network training apparatus and method for dental images through patient-specific data augmentation according to one embodiment of the present disclosure can calculate the mean and variance of tissue by applying a Gaussian mixture model (GMM) to a dental image, and generate an adaptive bone threshold value based on the calculated results to generate a bone mask.

The neural network training apparatus and method for dental images through patient-specific data augmentation according to one embodiment of the present disclosure can perform clear separation between teeth by performing connected component labeling (CCL) in an initial labeling process and then applying morphological erosion when labeling a metal insertion location in a dental image.

DETAILED DESCRIPTION

Figure 1:
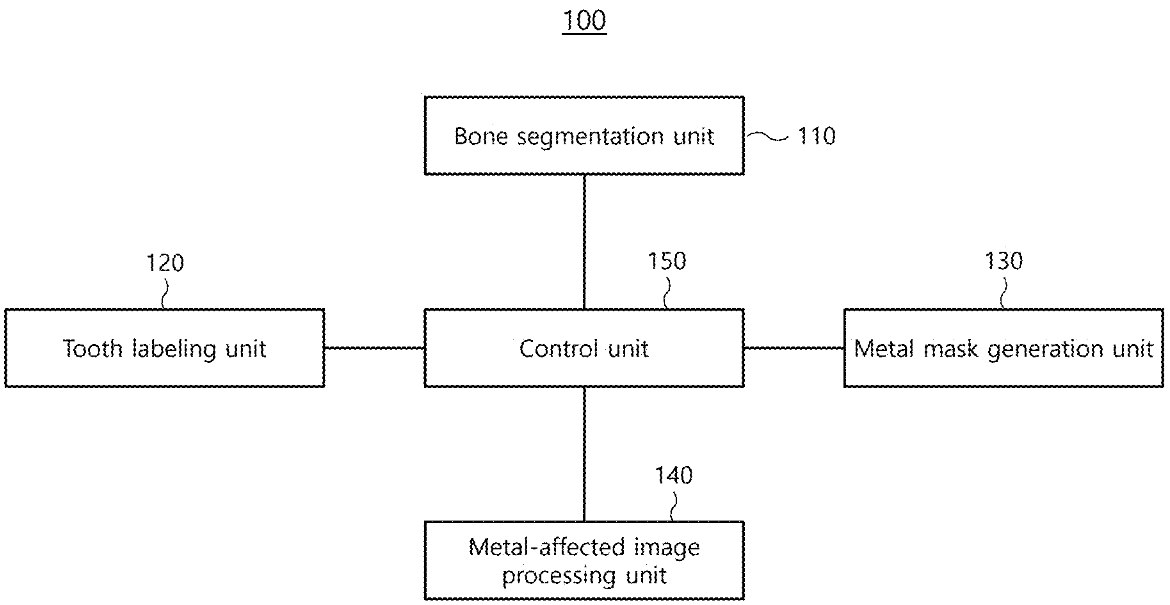
FIG. 1 is a diagram illustrating a configuration of a neural network training apparatus for dental images through patient-specific data augmentation according to one embodiment of the present disclosure.

Specific structural or functional descriptions in the embodiments of the present disclosure introduced in this specification or application are only for description of the embodiments of the present disclosure. The descriptions should not be construed as being limited to the embodiments described in the specification or application. The present disclosure may, however, be embodied in many different forms, but should be construed as covering modifications, equivalents or alternatives falling within ideas and technical scopes of the present disclosure. Further, since effects disclosed herein do not mean that a specific embodiment should include all or only the effects, the scope of the present disclosure should not be construed as being limited thereto.

Meanwhile, the meaning of terms described herein will be understood as follows.

It will be understood that, although the terms "first", "second", etc. may be used herein to distinguish one element from another element, these elements should not be limited by these terms. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

In each step, reference characters (e.g. a, b, c, etc.) are used for the convenience of description. The reference characters do not designate the order of the steps, and the steps may be performed in a different order unless the context clearly indicates otherwise. That is, the steps may be performed in the specified order, may be performed substantially simultaneously, or may be performed in a reverse order.

The present disclosure can be implemented as a computer-readable code on a computer-readable recording medium. The computer-readable recording medium includes all types of recording devices in which data readable by a computer system is stored. Examples of the computer-readable recording medium include ROM, RAM, CD-ROM, magnetic tape, floppy disk, an optical data storage device, etc. In addition, the computer-readable recording medium may be distributed in a computer system connected via a network, so that computer-readable codes may be stored and executed in a distributed manner.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 is a diagram illustrating a configuration of a neural network training apparatus for dental images through patient-specific data augmentation according to one embodiment of the present disclosure.

Referring to FIG. 1, the neural network training apparatus 100 for dental images through patient-specific data augmentation can simulate metal artifacts with a metal mask generated through bone segmentation and tooth labeling in a dental image and perform data augmentation to generate a metal-affected dental image, and may include a bone segmentation unit 110, a tooth labeling unit 120, a metal mask generation unit 130, a metal-affected image processing unit 140, and a control unit 150.

The bone segmentation unit 110 is a component that generates a bone mask by segmenting bones in a dental image, calculates the mean and variance of tissue by applying a Gaussian mixture model (GMM) to the dental image, and sets an adaptive bone threshold value using the mean and variance to generate a bone mask. The bone segmentation unit 110 is designed to accurately separate a bone from the tissue and generate a bone mask in consideration of the difference in attenuation coefficient between the tissue and the bone on the basis of the mean and variance of the tissue. This can clarify the location and structure of the tooth into which a metal is to be inserted, and provide basic data for subsequent tooth labeling and metal mask generation.

The bone segmentation unit 110 may perform the function of segmenting a bone using a slice that is not affected by the metal in dental CT data. In this process, the mean $\mu_w$ and standard deviation $\sigma_w$ of the tissue are calculated by applying a Gaussian mixture model (GMM), and an adaptive bone threshold can be set based on the mean and standard deviation. The adaptive threshold value may be represented by the following mathematical expression 1.

[Mathematical expression 1]

$$m_{b,adopt} = F(\text{phantom}) > \left(\mu_w + d \cdot \frac{\sigma_w}{\sigma_{phantom}}\right) \tag{1}$$

In the above mathematical expression 1, F represents median filtering, which serves to remove noise and derive a clearer bone structure, $\mu_w$ and $\sigma_w$ represent the mean and standard deviation of the tissue calculated using GMM, $\sigma_{phantom}$ represents the standard deviation of the entire image, through which the difference in attenuation coefficients of the tissue and bone can be analyzed, and d is a constant representing the difference between the soft tissue and the bone.

The bone segmentation unit 110 may generate a logical mask of the bone through this calculation, and separate the bone from a filtered image in which noise has been removed by applying a median filter. The bone mask generated through this process can be used as basic data for subsequent tooth labeling and metal mask generation.

The tooth labeling unit 120 is a component that individually labels teeth into which metal will be inserted on the basis of the bone mask generated in the bone segmentation unit 110 to finally generate a labeled dental image. The tooth labeling unit 120 first performs initial labeling using connected component labeling (CCL) on the bone mask. In this process, the tooth labeling unit 120 may individually distinguish teeth and assign an initial label to each tooth. After the initial label is assigned, threshold filtering is applied to the result obtained through the CCL, and small components below a certain threshold value are regarded as noise and removed, and thus only labels corresponding to real teeth can be filtered such that only the labels corresponding to the real teeth remain.

The tooth labeling unit 120 may be subjected to a sophisticated processing process to increase the accuracy of labeling. In particular, in initial labeling through the CCL, high-resolution image processing can be used to accurately distinguish individual teeth even if small tooth deformation or distortion occurs. In addition, the threshold filtering process can contribute to reducing the possibility of false detection by minimizing noise and leaving only real teeth using an optimized threshold value.

The tooth labeling unit 120 may perform clear tooth labeling that can break the connection between adjacent teeth and clearly distinguish between teeth by applying a morphological erosion operation. Morphological erosion can shrink the outer edge of the teeth, thereby removing the connection between adjacent teeth and forming a clear boundary. Through clear tooth labels obtained in this way, the teeth can be individually separated, and if necessary, shrunk region labeling may be applied to a shrunk region to supplement a missing tooth region.

Shrunk region labeling restores a shrunk tooth region in the morphological erosion process, allows the structure of each tooth to be completely maintained, and thereby completes tooth selection and generates a labeled dental image.

Through this series of processes, the tooth labeling unit 120 can clearly define the location and shape of the tooth into which the metal will be inserted and can provide an accurate labeled dental image that can be used in the metal mask generation unit.

The metal mask generation unit 130 is a component that generates a metal mask based on a labeled dental image and performs data augmentation to generate a plurality of augmented metal masks. The metal mask generation unit 130 may determine the number, shape, and size of metals to be inserted into the metal mask through a data augmentation process. Multiple metal masks generated through this determination process can form a dataset reflecting various metal insertion situations and can be used for subsequent metal artifact simulation and neural network training.

The metal mask generation unit 130 may generate various metal masks based on information obtained through tooth labeling and perform data augmentation. The metal mask generated from the labeled dental image determines the location, size, and shape of a metal object to be inserted, and thus multiple metal masks can be generated to secure data diversity. The metal mask generation unit 130 may determine the number of metal objects to be inserted into each metal mask according to experimental conditions, and the number of metal objects may be set to a variable number without being limited. The number of metal objects to be inserted is randomly selected based on tooth labeling results and can be set to be the same as the number of selected teeth.

The shape and size of each metal object may be determined based on the location and structure of the selected teeth. The metal mask generation unit 130 may generate a metal object in the form of a tooth shape, a crown, or a dental implant by reflecting the anatomical characteristics of the teeth, and through these settings, metal artifacts likely to appear in real dental CT can be simulated more accurately. This process can contribute to providing richer training data by simulating various metal artifacts in CT data of a patient as part of data augmentation.

The metal mask generated in this way can be used for data augmentation by pairing images with metal artifacts and images without metal, and can provide data to be used for training a metal artifact reduction network.

The metal mask generation unit 130 plays an important role in determining the location, size, and shape of a metal object, and thus accurate metal artifact simulation can be performed in subsequent steps.

The metal-affected image processing unit 140 may simulate polychromatic spectrum-based metal artifacts using a plurality of augmented metal masks and generate a metal-affected dental image by calculating a metal attenuation coefficient. The metal-affected image processing unit 140 may perform a polychromatic sinogram simulation to generate a metal insertion image by which various metal insertion situations can be reproduced and the intensity of metal artifacts can be controlled.

The metal-affected image processing unit 140 may apply beam hardening correction (BHC) and filtered back projection (FBP) to the generated metal insertion image to reduce distortion caused by metal artifacts and ultimately reconstruct a metal-affected dental image. Beam hardening correction serves to reduce distortion that occurs when an X-ray passes through metal, and filtered back projection can accurately reconstruct a dental CT image based on sinogram data.

In addition, the metal-affected image processing unit 140 may finely adjust the intensity of metal artifact by adjusting the attenuation coefficient of the metal during the polychromatic sinogram simulation process. Through this, the metal-affected image processing unit 140 can generate a metal-affected dental image that reflects various metal artifacts that may occur in a real clinical environment, and can provide an accurate dataset that can be used for subsequent neural network training.

The metal-affected image processing unit 140 may simulate metal artifacts based on a polychromatic spectrum using a plurality of augmented metal masks and generate a metal-affected dental image by calculating the metal attenuation coefficient. The metal-affected image processing unit 140 may perform a polychromatic sinogram simulation to generate a metal insertion image by which various metal insertion situations can be reproduced and the intensity of metal artifact can be controlled.

1. Metal Artifact Simulation

The metal-affected image processing unit 140 may generate a sinogram using a polychromatic spectrum with reference to the method proposed by Zhang et al. (Zhang Y, Yu H, "Convolutional neural network based metal artifact reduction in x-ray computed tomography," IEEE Transactions on Medical Imaging, vol. 37, no. 6, pp. 1370-1381, 2018), and simulate metal artifacts based thereon. In this process, the metal-affected image processing unit 140 may first segment tissues corresponding to bone and water, and then collect projection data using a polychromatic energy spectrum. Thereafter, the generated projection data may be linearized by applying a simple beam hardening correction (BHC) using a water phantom thereto, and a final dental CT image may be reconstructed through filtered back projection (FBP). This simulation process can generate various metal artifact and metal-free image pairs using a metal mask, and can be designed to reproduce conditions similar to a real clinical environment by adjusting the intensity of metal artifacts.

2. Setting Metal Attenuation Coefficient

The metal-affected image processing unit 140 may finely adjust the intensity of metal artifacts by setting a metal attenuation coefficient. The metal attenuation coefficient is an important factor in determining the intensity of metal artifacts, and in order to accurately calculate the metal attenuation coefficient, the metal-affected image processing unit 140 may first generate a metal mask by segmenting a metal from a metal-inserted slice, and apply an initial attenuation coefficient to simulate metal artifacts. From the simulated results, a pixel value difference in a local area such as the palate area may be calculated, and the attenuation coefficient may be repeatedly updated by comparing the same with a real metal-affected slice. Through this process, the attenuation coefficient is adjusted until it converges, and finally, a dental CT image having an intensity similar to real metal artifacts can be generated. Through this repeated attenuation coefficient adjustment, the metal-affected image processing unit 140 can precisely reproduce metal artifacts under various simulation conditions and provide a high-precision dataset required for neural network training.

The control unit 150 may manage the overall control operation of the neural network training apparatus 100 for dental images through patient-specific data augmentation and manage a control flow or data flow between the bone segmentation unit 110, the tooth labeling unit 120, the metal mask generation unit 130, and the metal-affected image processing unit 140.

Figure 2:
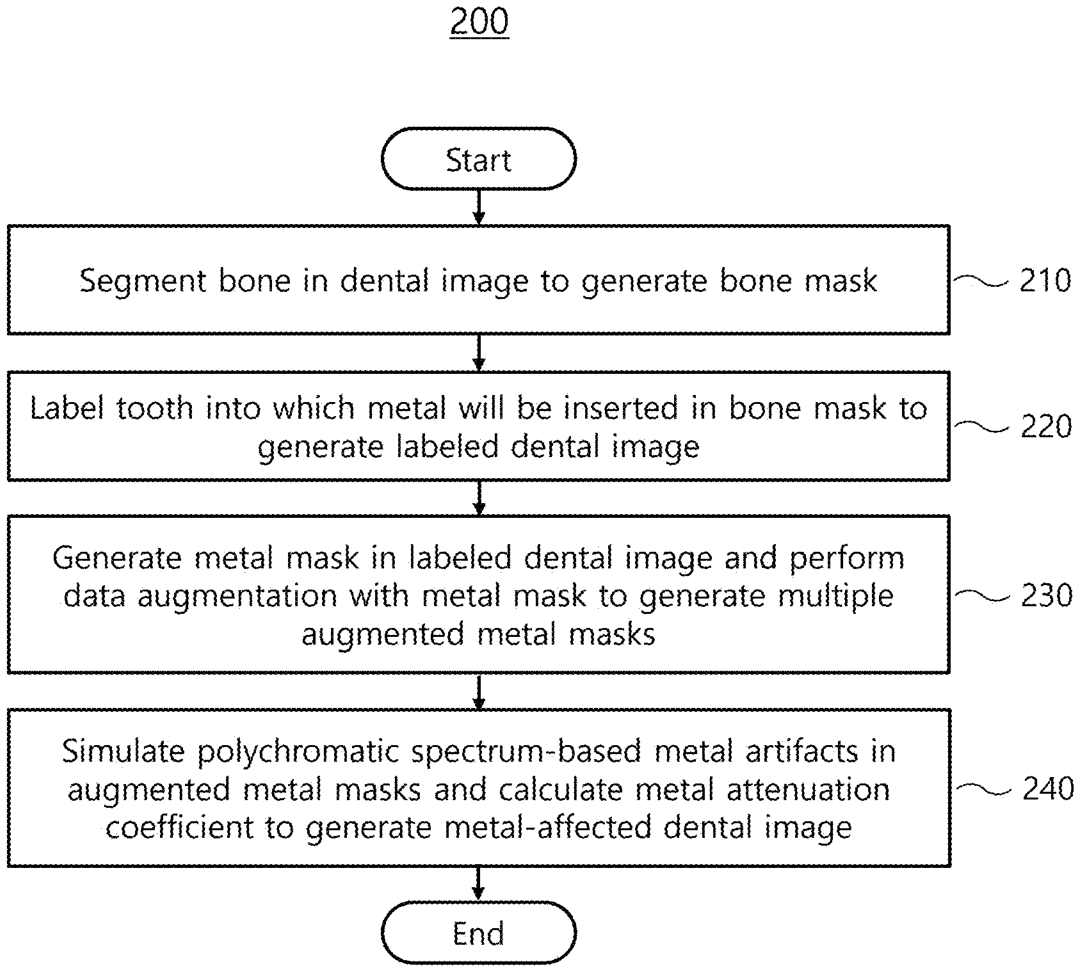
FIG. 2 is a flowchart illustrating the operation of the neural network training apparatus for dental images through patient-specific data augmentation in FIG. 1.

FIG. 2 is a flowchart illustrating the operation of the neural network training apparatus for dental images through patient-specific data augmentation in FIG. 1.

In FIG. 2, the flowchart 200 of the neural network training method for dental images through patient-tailored data augmentation includes a bone segmentation step 210 of segmenting a bone in a dental image to generate a bone mask, a tooth labeling step 220 of labeling a tooth into which a metal will be inserted in the bone mask to generate a labeled dental image, a metal mask generation step 230 of generating a metal mask in the labeled dental image and performing data augmentation with the metal mask to generate a plurality of augmented metal masks, and a metal-affected image processing step 240 of simulating polychromatic spectrum-based metal artifacts in the plurality of augmented metal masks and calculating a metal attenuation coefficient to generate a metal-affected dental image.

The bone segmentation step 210 includes a process of segmenting a bone in a dental image to generate a bone mask. In this step, a Gaussian mixture model (GMM) may be applied to the dental image to calculate the mean and variance of the tissue, and an adaptive bone threshold value may be set based thereon. The adaptive threshold value enables accurate segmentation of the bone by considering the difference in attenuation coefficient between the tissue and the bone. The bone mask generated during this process may be used to identify and label teeth in subsequent steps.

The tooth labeling step 220 is a process of individually labeling a tooth into which metal will be inserted on the basis of the bone mask generated in the bone segmentation step 210 to generate a labeled dental image. In this step, initial labeling is performed mainly using connected component labeling (CCL), and each tooth can be individually distinguished and assigned a label. In addition, noise can be removed through threshold filtering, and a morphological erosion operation can be applied to disconnect adjacent teeth to form a clear boundary between individual teeth. If necessary, shrunk region labeling may be applied to a shrunk region to restore a missing tooth region, thereby finally generating a labeled dental image.

The metal mask generation step 230 includes a process of generating a metal mask from the labeled dental image and performing data augmentation based on the metal mask to generate a plurality of augmented metal masks. In this step, the location and size of the metal to be inserted are determined on the basis of tooth labeling results, and the shapes and numbers of various metal objects may be set. In addition, the shape and size of each metal object are generated such that they reflect the location and shape of a selected tooth, and various metal artifacts can be simulated through various types of metal masks. Accordingly, an image with metal artifacts and an image without metal can be paired to generate augmented data.

The metal-affected image processing step 240 includes a process of simulating polychromatic spectrum-based metal artifacts on the plurality of augmented metal masks and calculating a metal attenuation coefficient to generate a metal-affected dental image. In this step, first, metal insertion images are generated through polychromatic sinogram simulation, and then beam hardening correction (BHC) and filtered back projection (FBP) algorithms are applied to finally reconstruct a metal-affected dental image. In addition, by controlling the intensity of metal artifacts by adjusting the metal attenuation coefficient, metal artifacts under various conditions can be reproduced more realistically.

Figure 3:
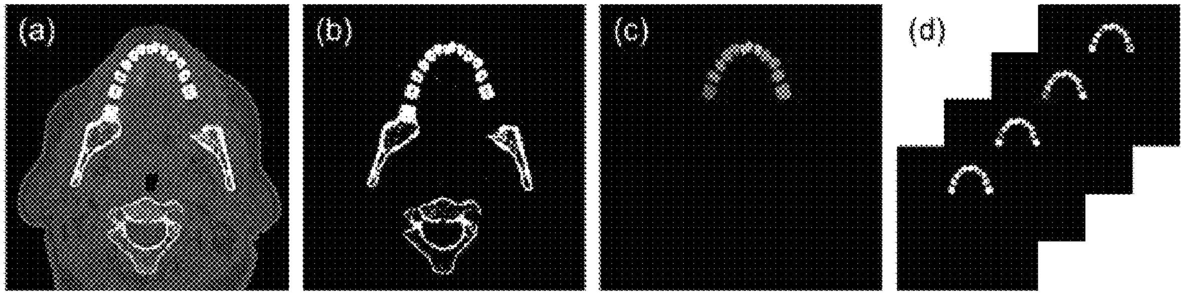
FIG. 3 is a diagram visually illustrating each step of a dental image processing process of the neural network training apparatus for dental images through patient-specific data augmentation in FIG. 1.

FIG. 3 is a diagram visually showing each step of the dental image processing process of the neural network training apparatus for dental images through the patient-specific data augmentation in FIG. 1.

Referring to FIG. 3, (a) shows a dental CT image that is not affected by metal, and can provide a slice in which no metal object is inserted in original data. The bone segmentation step may be performed on the basis of this image, and (b) shows a bone mask obtained through the bone segmentation unit 110. The bone segmentation unit may distinguish between a soft tissue and a bone using a Gaussian mixture model (GMM) and generate a logical mask of the bone by using a median filter.

(c) shows a tooth labeling result performed by the tooth labeling unit 120, and using this, teeth can be individually identified using connected component labeling (CCL) in the bone mask, and clear distinction between teeth can be formed by disconnecting adjacent teeth through a morphological erosion operation. Finally, (d) shows metal masks generated through the metal mask generation unit 130. Various types of metal masks can be generated such that various metal artifacts can be simulated by determining the location and size of the metal to be inserted on the basis of labeled tooth information.

Figure 4:
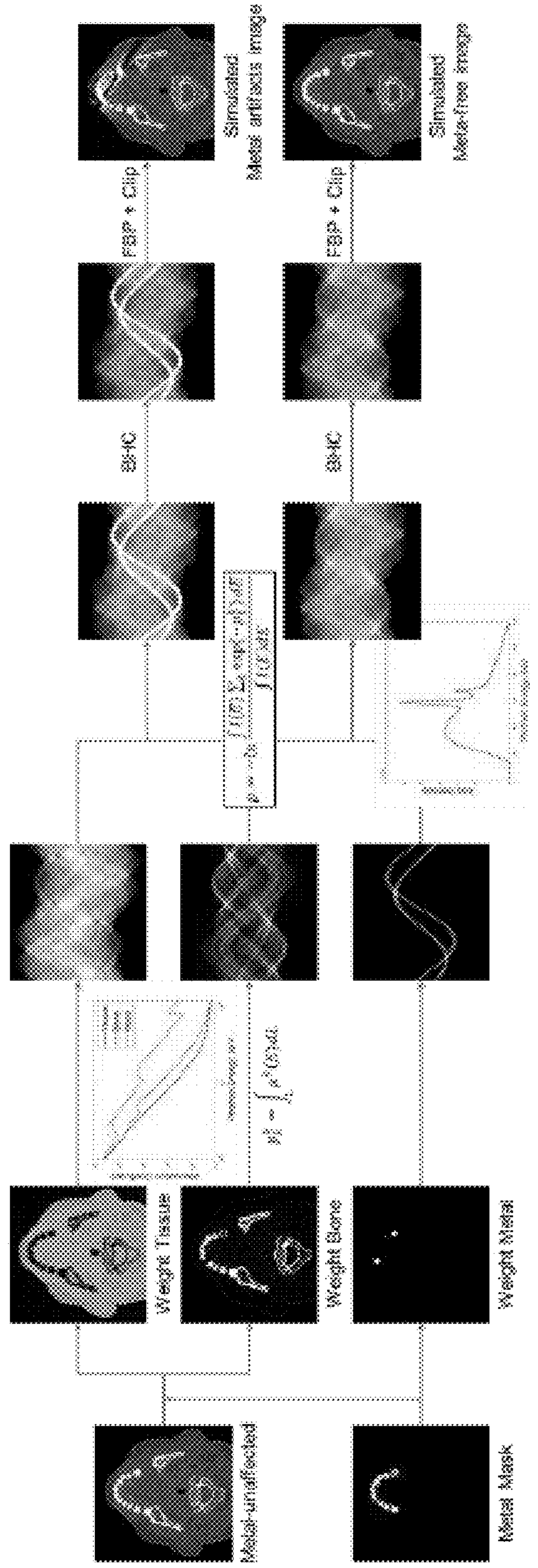
FIG. 4 is a diagram illustrating a process of simulating metal artifacts and non-artifact images of the neural network training apparatus for dental images through patient-specific data augmentation in FIG. 1.

FIG. 4 is a diagram illustrating a process of simulating metal artifacts and non-artifact images in the neural network training apparatus for dental images through patient-specific data augmentation in FIG. 1.

Referring to FIG. 4, the metal-affected image processing unit 140 may simulate a polychromatic sinogram and metal artifacts based on the method proposed by Zhang et al. (Zhang Y, Yu H, "Convolutional neural network based metal artifact reduction in x-ray computed tomography," IEEE Transactions on Medical Imaging, vol. 37, no. 6, pp. 1370-1381, 2018). The metal-affected image processing unit 140 may first segment a bone and a water-equivalent tissue using a metal-free slice, and collect projection data using a polychromatic energy spectrum.

The collected projection data may be linearized by the metal-affected image processing unit 140 through simple Beam Hardening Correction (BHC) using a water phantom, thereby reducing distortion of projection and enabling accurate reconstruction. Thereafter, the metal-affected image processing unit 140 may reconstruct a simulated metal artifact image using the Filtered Back Projection (FBP) algorithm. The metal artifact image generated in this way may be clipped to minimum and maximum values of the phantom to match the range appearing in the real CT scan.

In addition, the metal-affected image processing unit 140 may simulate various metal-free images on the basis of the generated metal mask. By generating pairs of metal artifact images and metal-free images, the metal-affected image processing unit 140 can provide training data for effectively removing metal artifacts in the neural network training apparatus. FIG. 2 visually shows the overall process and results of such metal artifact simulation, and can clearly show the simulation procedure that can be performed by the metal-affected image processing unit 140.

Figure 5:
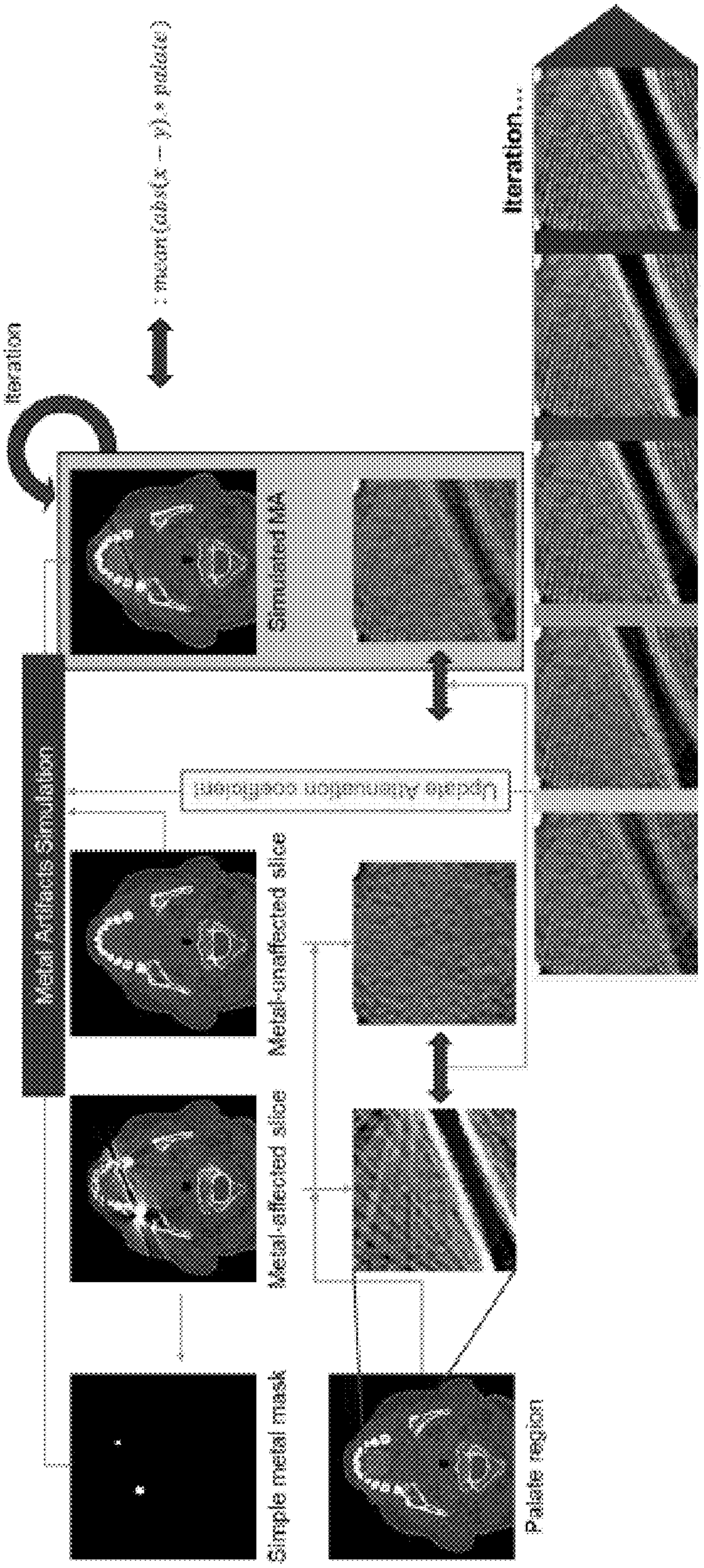
FIG. 5 is a diagram illustrating a process of setting an attenuation coefficient of a metal in a metal artifact simulation of the neural network training apparatus for dental images through patient-specific data augmentation in FIG. 1.

FIG. 5 is a diagram illustrating a process of setting a metal attenuation coefficient in the metal artifact simulation of the neural network training apparatus for dental images through patient-specific data augmentation in FIG. 1.

The metal attenuation coefficient is an important factor in determining the intensity of metal artifacts, and since it cannot be accurately estimated with only patient data, it can be calculated through simulation.

Referring to FIG. 5, the metal-affected image processing unit 140 may first generate a metal mask from a slice containing a metal, and simulate metal artifacts based on the initial attenuation coefficient using a slice without metal and this metal mask. Then, from the simulated results, the mean of tissue pixel value differences caused by metal artifacts in a local area of the palate may be calculated, and a mean pixel value difference in the same area of the slice containing metal and the slice without metal may be calculated. The metal attenuation coefficient may be updated by comparing the two difference values, and this process may be repeated until the attenuation coefficient converges.

Table 1 below shows an algorithm for setting a metal attenuation coefficient in the form of a formula.

TABLE 1

```
μ = μinit
diff = sum(abs(x · palate − y · palate)
while(loss < min_loss):
  y' = Simul(x; μ)
  loss = dif − sum(abs(y' · palate − y · palate)
  μ += loss*lr
```

Here, x, y, y', and palate represent a metal-free slice, a metal-containing slice, a simulated metal artifact image, and a local area of the palate, respectively. "Simul", "sum", and "abs" represent a metal artifact simulation process, a sum of elements, and an absolute value, respectively, and $\mu$ and lr represent an attenuation coefficient and a learning rate of the metal.

The metal-affected image processing unit 140 may simulate metal artifacts in a similar form to when they occur in actual data through such a series of processes and algorithm, and can generate a simulation image that accurately reflects the intensity of the metal artifacts by optimizing the attenuation coefficient.

In order to verify the performance of the neural network training apparatus 100 for dental images through patient-specific data augmentation of the present disclosure, a metal artifact reduction experiment can be performed using dental CT data. The experiment can be composed of a dataset preparation step and a neural network training and performance evaluation step.

The experimental dataset is dental CT slices of a single patent collected in TCIA, which can include 27 metal artifact-containing slices and 4 metal-free slices. The 4 metal-free slices are used to generate 2000 image pairs with 1 to 4 metal objects randomly inserted through simulation, which can be utilized as training and validation data. In addition, a total of 1955 dental CT slices from data of seven patients are used to generate datasets through two comparison methods (STW and STW+BHC) for performance comparison with existing methods. All datasets are processed to maintain consistency by being clipped to [−1024, 3071] HU, which is the range of real metal artifact data.

The U-net architecture is used for neural network training, and training can be performed for 100 epochs based on the Mean Square Error (MSE) loss function. During the training process, the image size can be randomly cropped to 256×256 pixels through data augmentation, and the diversity of training data can be increased by applying random rotation and horizontal/vertical flip between 0 and 180 degrees. The experimental results can be evaluated by being divided into a proposed result, comparison result 1, and comparison result 2 by comparing the performance between the proposed method and two comparative methods (STW and STW+BHC).

Figure 6:
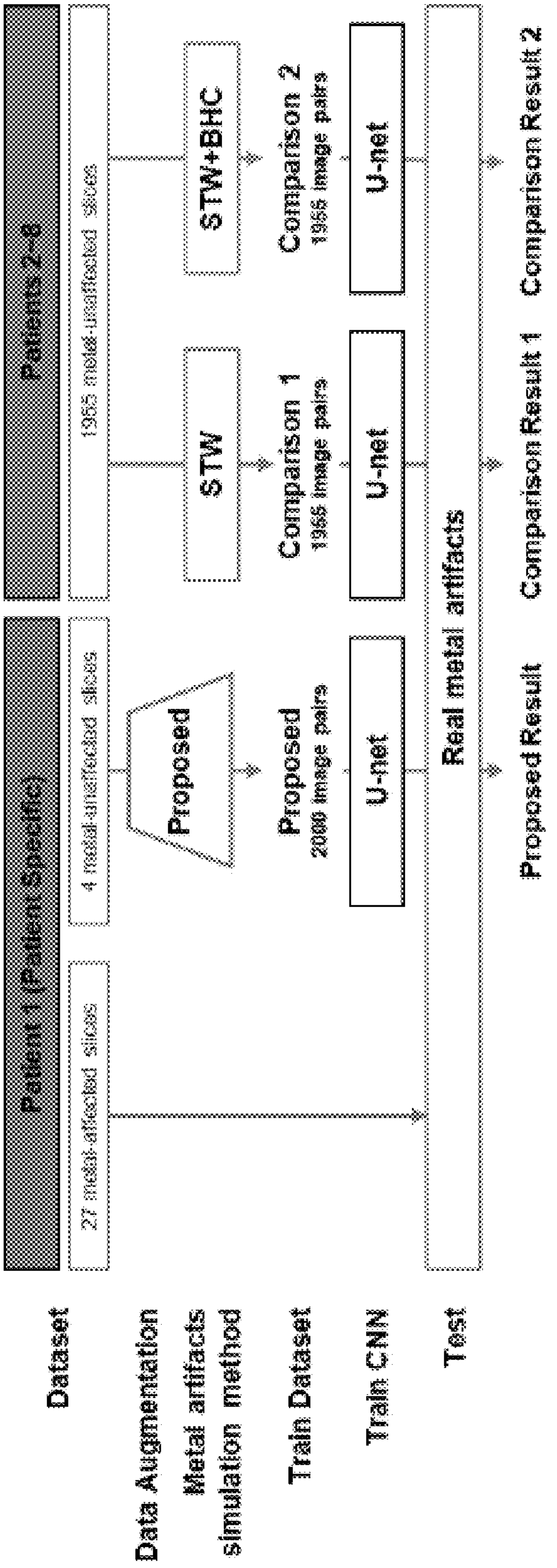
FIG. 6 is a diagram visually showing the proposed method and comparative methods through a dataset, a data augmentation and metal artifact simulation method, a training dataset, neural network training, and a flow of test results of the neural network training apparatus for dental images through patient-specific data augmentation in FIG. 1.

FIG. 6 is a diagram visually showing the proposed method and comparative methods through a dataset, a data augmentation and metal artifact simulation method, a training dataset, neural network training, and a flow of test results of the neural network training apparatus for dental images through patient-specific data augmentation in FIG. 1.

Referring to FIG. 6, 27 metal-affected slices and 4 metal-free slices out of 31 dental CT slices of patient 1 are used. The 4 metal-free slices can be utilized to generate 2000 training data pairs using the neural network training apparatus 100 for dental images through patient-specific data augmentation. On the other hand, 1955 metal-free slices are additionally collected from data of other 7 patients and can be used for data augmentation and simulation of comparative method 1 (STW) and comparative method 2 (STW+BHC).

Each data can be trained through a U-net-based CNN and finally tested using CT slices containing real metal artifacts. The experimental results in the neural network training apparatus 100 for dental images through patient-specific data augmentation are indicated as "Proposed Result", the experimental results of the comparison method 1 (STW) are indicated as "Comparison Result 1", and the experimental results of the comparison method 2 (STW+BHC) are indicated as "Comparison Result 2". Through this, the entire experimental process and comparison results for testing the metal artifact reduction performance of each method proposed in FIG. 6 can be visually displayed.

Figure 7:
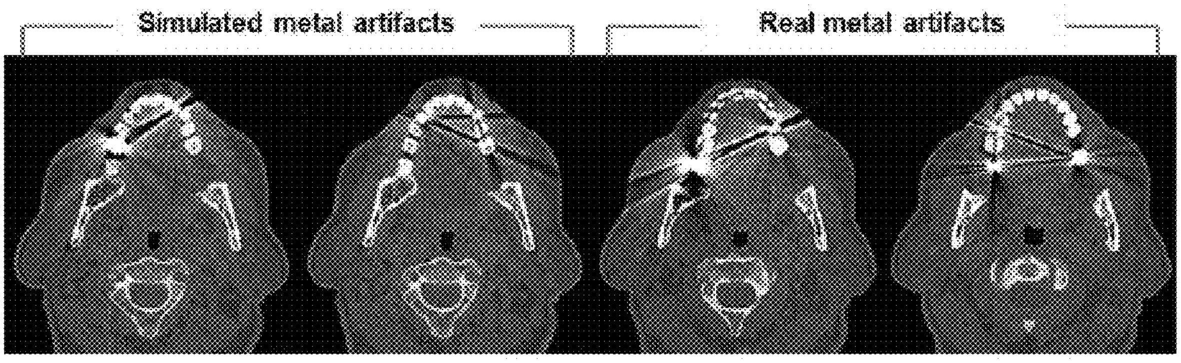
FIG. 7 is a diagram showing a visual comparison between simulated metal artifacts of the neural network training apparatus for dental images through patient-specific data augmentation of FIG. 1 and real metal artifacts.

FIG. 7 is a diagram showing a visual comparison of simulated metal artifacts in the neural network training apparatus for dental images through patient-specific data augmentation of FIG. 1 and real metal artifacts.

FIG. 7 compares the difference between simulated metal artifacts and real metal artifacts, and the range of the displayed window is set to [−500, 1500] HU.

The simulated metal artifact images reproduce streaking artifacts and dark banding phenomena similar to real metal artifacts, thereby mimicking the characteristics of typical artifacts that occur when metal is inserted. These simulation results allow for the effective training and metal artifact reduction performance of the neural network training apparatus 100 for dental images through patient-specific data augmentation to be confirmed through comparison with metal artifacts appearing in real dental CT.

Figure 8:
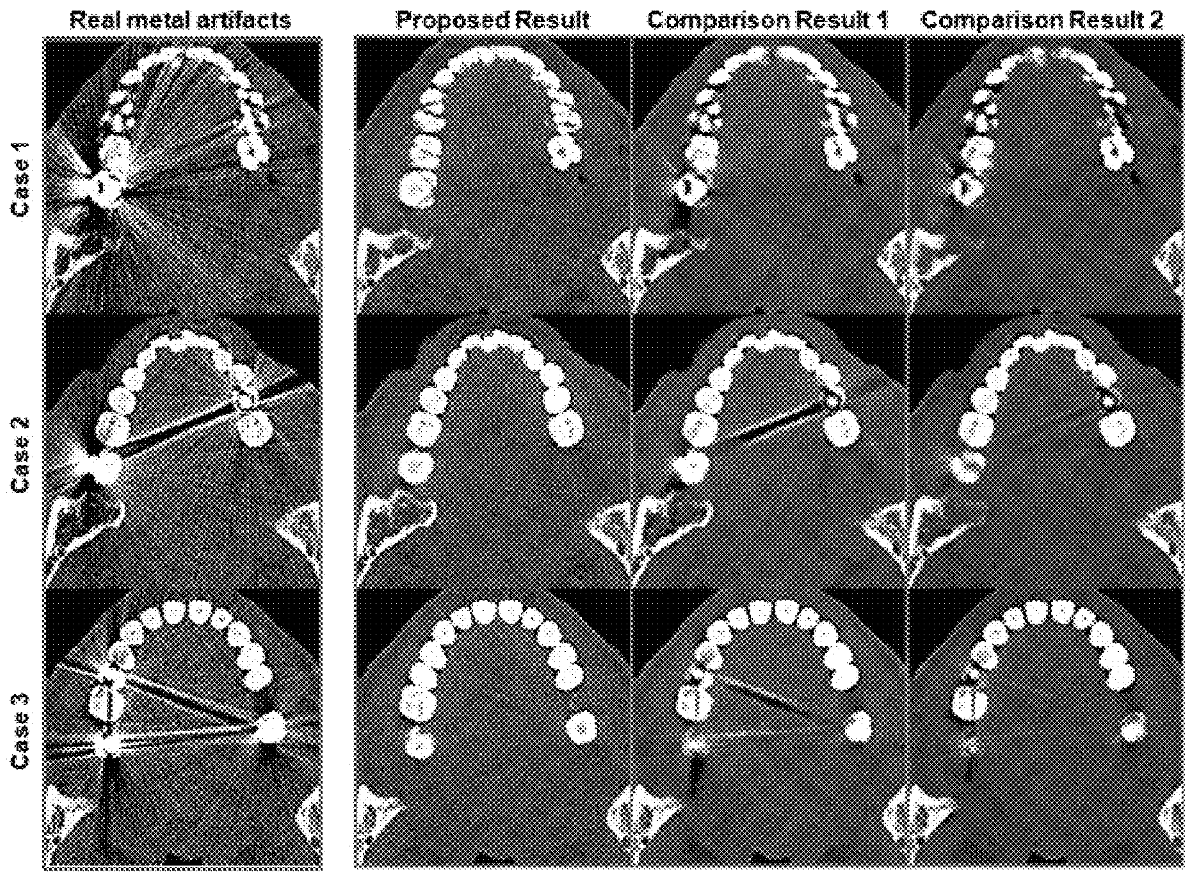
FIG. 8 is a diagram showing comparison of results of metal artifact reduction of the metal artifact reduction method of the neural network training apparatus for dental images through patient-specific data augmentation of FIG. 1, comparative method 1 (STW: Standard Weighted), and comparative method 2 (STW+BHC: Standard Weighted+Beam Hardening Correction).

FIG. 8 is a diagram showing comparison of results of metal artifact reduction of the metal artifact reduction method of the neural network training apparatus for dental images through patient-specific data augmentation of FIG. 1, comparative method 1 (STW: Standard Weighted), and comparative method 2 (STW+BHC: Standard Weighted+Beam Hardening Correction).

In FIG. 8, real metal artifacts and the processing results of the respective methods for three cases are arranged side by side such that the performance of metal artifact reduction can be visually compared.

In each case, the method proposed by the neural network training apparatus 100 for dental images through patient-specific data augmentation can effectively reduce metal artifacts while well restoring the anatomical structure of the teeth. On the other hand, the results of comparative method 1 and comparative method 2 still show residual artifacts, and in particular, the structure around the teeth may become blurred or the overall image clarity may decrease. Through this, it can be confirmed that the metal artifact reduction method proposed in the present disclosure has excellent performance in effectively reducing artifacts while maintaining the tooth outline and original structure better than existing methods.

The window shown in FIG. 8 is set to [−500, 1500] HU, which allows for a clear comparison and evaluation of metal artifacts with various intensities.

Figure 9:
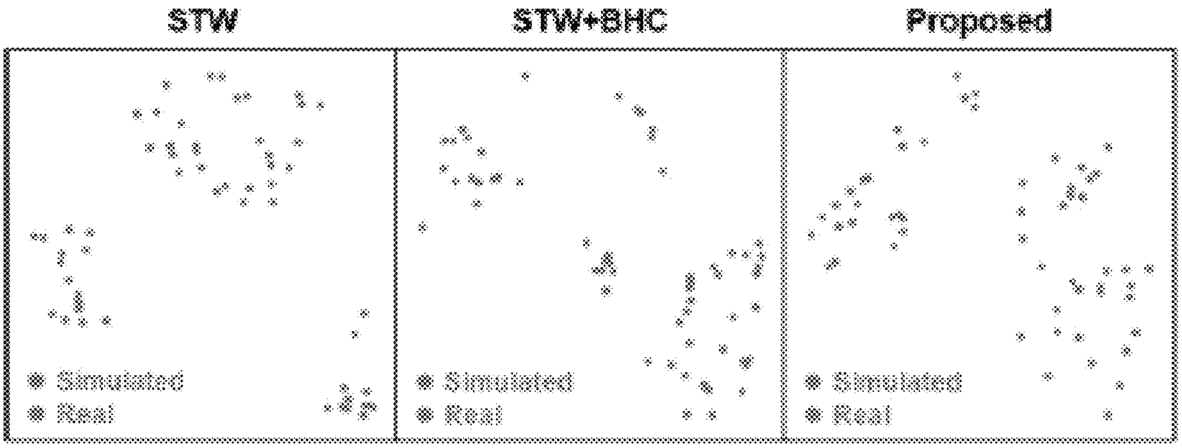
FIG. 9 is a diagram visualizing a distribution of features extracted from the second encoding block of each dataset of the neural network training apparatus for dental images through patient-specific data augmentation of FIG. 1 using t-SNE.

FIG. 9 is a diagram visualizing a distribution of features extracted from the second encoding block of each dataset of the neural network training apparatus for dental images through patient-specific data augmentation of FIG. 1 using t-SNE.

Referring to FIG. 9, each graph visualizes features extracted from the second encoding block of the neural network, the red dots represent the feature of a simulated data domain, and the blue dots represent the feature of a real data domain.

As can be ascertained from the figure, in the case of comparative method 1 (STW) and comparative method 2 (STW+BHC), the features of the simulated domain and the real domain are clearly separated, and there is a large difference between the two domains. On the other hand, in the method proposed in the present disclosure, the overlap of features between the simulated domain and the real domain is confirmed, which shows that the data augmentation method proposed in the present disclosure can effectively reduce the domain difference between the simulation and real data.

The neural network training apparatus 100 for dental images through patient-specific data augmentation proposed in the present disclosure can provide a data augmentation method capable of effectively training a deep learning network for metal artifact reduction by utilizing a limited amount of dental CT volume. As a result of experiments, it is confirmed that the domain gap between the training data and the test dataset can have a negative effect on the actual metal artifact reduction performance. However, it can be proven that the patient-specific data augmentation method proposed in the present disclosure is more suitable for reducing real metal artifacts than a method generated with a large dataset, despite using a small amount of data.

Although the method proposed by the present disclosure works effectively, there may still be a difference between simulated data and real data. As can be ascertained from the feature distribution in FIG. 9, the domain gap between the simulated data and the real data is not completely resolved. One approach to improve this is to utilize transfer learning. Transfer learning can improve alignment between two domains by allowing a network to better adapt to a real domain based on the knowledge learned in a simulated domain.

Although the above has been described with reference to the preferred embodiments of the present disclosure, those skilled in the art will understand that the present disclosure can be modified and changed in various manners within the scope and spirit of the present disclosure set forth in the following claims.

[Acknowledgement]

Project Serial No: 2710006677

Project No: RS-2020-II201361

Department: Ministry of Science and ICT

Project management (Professional) Institute: Institute of Information &

Communications Technology Planning & Evaluation

Research Project Name: Nurturing ICT and Broadcasting Innovation Talents (R&D) Research task Name: Artificial Intelligence Graduate School Support Project (Yonsei University)

Project Performing Institute: University Industry Foundation, Yonsei University

Research Period: 2024.01.01~2024.12.31

Project Serial No: 2710002082

Project No: RS-2023-00240135

Department: Ministry of Science and ICT

Project management (Professional) Institute: National Research Foundation of Korea Research Project Name: Original technology development project Research task Name: Development of patient-specific carbon nano X-ray tube-based multi-source C-arm CT imaging system equipped with 3D position tracking navigation for robotic surgical image guidance Project Performing Institute: University Industry Foundation, Yonsei University Research Period: 2024.01.01~ 2024.12.31

DETAILED DESCRIPTION OF MAIN ELEMENTS

100: Neural network training apparatus for dental images through patient-specific data augmentation

110: Bone segmentation unit

120: Tooth labeling unit

130: Metal mask generation unit

140: Metal-affected image processing unit

150: Control unit

What is claimed is:

1. A neural network training apparatus for dental images through patient-specific data augmentation, comprising:

a bone segmentation unit configured to segment a bone in a dental image to generate a bone mask;

a tooth labeling unit configured to label a tooth into which a metal will be inserted in the bone mask to generate a labeled dental image;

a metal mask generation unit configured to generate a metal mask in the labeled dental image and perform data augmentation with the metal mask to generate a plurality of augmented metal masks; and a metal-affected image processing unit configured to simulate polychromatic spectrum-based metal artifacts in the plurality of augmented metal masks and calculate a metal attenuation coefficient to generate a metal-affected dental image.

2. The neural network training apparatus of claim 1, wherein the bone segmentation unit calculates a mean and a variance of tissue by applying a Gaussian mixture model (GMM) to the dental image and calculates an adaptive bone threshold value through the mean and variance.

3. The neural network training apparatus of claim 2, wherein the bone segmentation unit generates the bone mask such that the bone is segmented from the tissue by considering an attenuation coefficient difference between the tissue and the bone through the mean and variance.

4. The neural network training apparatus of claim 1, wherein the tooth labeling unit performs initial labeling through connected component labeling (CCL) on the bone mask, separates the tooth through morphological erosion, and then completes the labeling.

5. The neural network training apparatus of claim 4, wherein the tooth labeling unit performs real tooth labeling by applying threshold filtering to the initial label obtained through the connected component labeling (CCL) to remove noise below a certain threshold value.

6. The neural network training apparatus of claim 5, wherein the tooth labeling unit performs clear tooth labeling by applying morphological erosion to the real tooth labeling to disconnect adjacent teeth and clearly distinguish between the adjacent teeth.

7. The neural network training apparatus of claim 6, wherein the tooth labeling unit applies shrunk region labeling to the clear tooth labeling to supplement a tooth region that has disappeared due to the morphological erosion and generates the labeled dental image through tooth selection.

8. The neural network training apparatus of claim 1, wherein the metal mask generation unit determines the number, shape, and size of a metal to be inserted into the metal mask through data augmentation to generate the plurality of augmented metal masks.

9. The neural network training apparatus of claim 1, wherein the metal-affected image processing unit performs polychromatic sinogram simulation on the plurality of augmented metal masks, generates a metal insertion image, and applies beam hardening correction and filtered back projection to the metal insertion image to generate the metal-affected dental image.

10. The neural network training apparatus of claim 9, wherein the metal-affected image processing unit adjusts the intensity of the metal artifacts by adjusting the metal attenuation coefficient during the polychromatic sinogram simulation process.

11. A neural network training method for dental images through patient-specific data augmentation, performed in a neural network training apparatus for dental images through patient-specific data augmentation, comprising:

a bone segmentation step of segmenting a bone in a dental image to generate a bone mask;

a tooth labeling step of labeling a tooth into which a metal will be inserted in the bone mask to generate a labeled dental image;

a metal mask generation step of generating a metal mask in the labeled dental image and performing data augmentation with the metal mask to generate a plurality of augmented metal masks; and a metal-affected image processing step of simulating polychromatic spectrum-based metal artifacts in the plurality of augmented metal masks and calculating a metal attenuation coefficient to generate a metal-affected dental image.

* * * * *